US009174749B2

(12) United States Patent
Prampolini et al.

(10) Patent No.: US 9,174,749 B2
(45) Date of Patent: *Nov. 3, 2015

(54) REUSABLE MODULE FOR LAUNCHER

(75) Inventors: Marco Prampolini, Chambourcy (FR); Olivier Gogdet, Saint Germain en Laye (FR)

(73) Assignee: ASTRIUM SAS, Paris (FR)

( * ) Notice: Subject to any disclaimer, the term of this patent is extended or adjusted under 35 U.S.C. 154(b) by 1041 days.

This patent is subject to a terminal disclaimer.

(21) Appl. No.: 13/141,162

(22) PCT Filed: Dec. 18, 2009

(86) PCT No.: PCT/EP2009/067549
§ 371 (c)(1), (2), (4) Date: Aug. 24, 2011

(87) PCT Pub. No.: WO2010/072681
PCT Pub. Date: Jul. 1, 2010

(65) Prior Publication Data
US 2011/0297793 A1 Dec. 8, 2011

(30) Foreign Application Priority Data
Dec. 22, 2008 (FR) .................................... 08 58940

(51) Int. Cl.
*B64G 1/00* (2006.01)
*B64G 1/40* (2006.01)
(52) U.S. Cl.
CPC ................. *B64G 1/002* (2013.01); *B64G 1/401* (2013.01); *B64G 1/402* (2013.01)
(58) Field of Classification Search
CPC .............. B64G 1/12; B64G 1/14; B64G 1/62; B64G 1/002
USPC ............................................ 244/158.9, 159.3
See application file for complete search history.

(56) References Cited

U.S. PATENT DOCUMENTS 3,104,079 A * 9/1963 Phillips ....................... 244/159.3
6,076,771 A * 6/2000 Bailey et al. ............... 244/158.9
(Continued)

FOREIGN PATENT DOCUMENTS

CN 1337912 A 2/2002
EP 1 162 139 A1 12/2001
(Continued)

OTHER PUBLICATIONS

Japanese Office Action issued Dec. 3, 2013 in Patent Application No. 2011-541484 with English Translation.
(Continued)

*Primary Examiner* — Rob Swiatek
(74) *Attorney, Agent, or Firm* — Oblon, McClelland, Maier & Neustadt, L.L.P.

(57) ABSTRACT

A propulsion module configured to launch a craft into space including a recoverable module and a non-recovered part, which is secured to the recoverable module at launch. The recoverable module includes a propulsive system to launch the craft, systems for command and control of the propulsive system, a subsonic flight propulsion motor, airfoils for the subsonic flight, a landing gear, and a braking parachute. The recoverable module is installed in a lower position of the craft when the craft is in the launch position. The non-recovered part includes at least one tank to feed the propulsive system. The recoverable module and the non-recovered part are configured to be separated when the propulsion module reaches a given altitude, and the recoverable module is capable of landing in a controlled fashion after a coasting flight, for example for a return to the launch site.

19 Claims, 6 Drawing Sheets

(56) References Cited

U.S. PATENT DOCUMENTS

| | | | |
|---|---|---|---|
| 6,193,187 B1 | 2/2001 | Scott et al. | |
| 6,450,452 B1 | 9/2002 | Spencer et al. | |
| 6,454,216 B1 | 9/2002 | Kiselev et al. | |
| 6,612,522 B1 * | 9/2003 | Aldrin et al. | 244/2 |
| 6,616,092 B1 | 9/2003 | Barnes et al. | |
| 6,817,580 B2 * | 11/2004 | Smith | 244/158.9 |
| 7,834,859 B2 * | 11/2010 | Wainfan et al. | 345/173 |
| 8,047,472 B1 * | 11/2011 | Brand et al. | 244/158.9 |

FOREIGN PATENT DOCUMENTS

| | | |
|---|---|---|
| JP | 2002-535193 A | 10/2002 |
| JP | 2003-20000 A | 1/2003 |
| JP | 2003-512254 A | 4/2003 |
| RU | 2 148 536 C1 | 5/2000 |
| RU | 2 233 772 C2 | 8/2004 |
| UA | 31 718 U | 4/2008 |
| WO | WO 88/02332 A1 | 4/1988 |
| WO | WO 99/47418 A1 | 9/1999 |
| WO | WO 00/43267 A2 | 7/2000 |

OTHER PUBLICATIONS

French Preliminary Search Report issued Aug. 12, 2009, in Patent Application No. FR 0858940.

U.S. Appl. No. 13/704,136, filed Dec. 13, 2012, Prampolini.

Russian Office Action issued Nov. 1, 2013 in Patent Application No. 2011130510 with English Translation.

I.I. Shuneyko, "Results of Science and Technology. Rocket Production. Winged Spaceships", Publisher "Moscow", 1966, pp. 22, 27, Fig. 1.1, (with information in English), 5 pages.

"World Manned Space Flight. Moscow", Publisher "RT Soft", 2005, p. 98, Figure: PH <<Saturn-1>>, PH <<Saturn-1B>>PH <<Saturn 5>>, (with information in English), 3 pages.

* cited by examiner

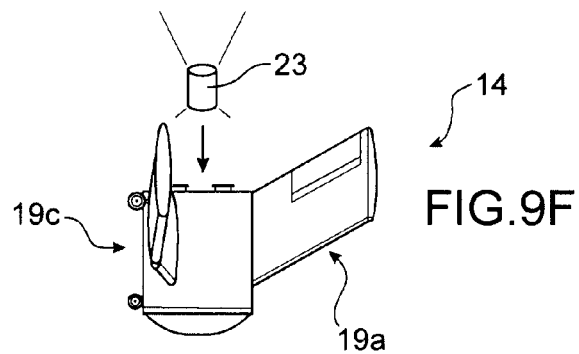
FIG.9F
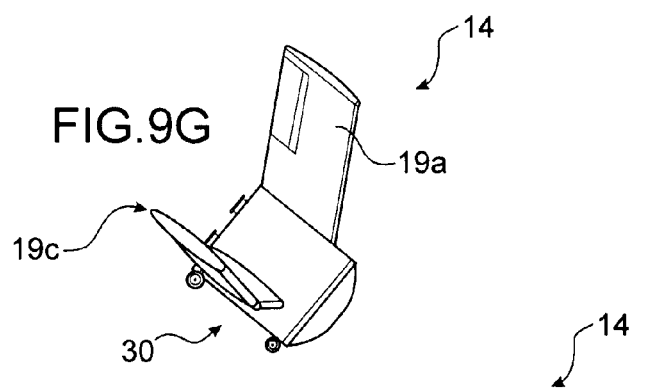
FIG.9G
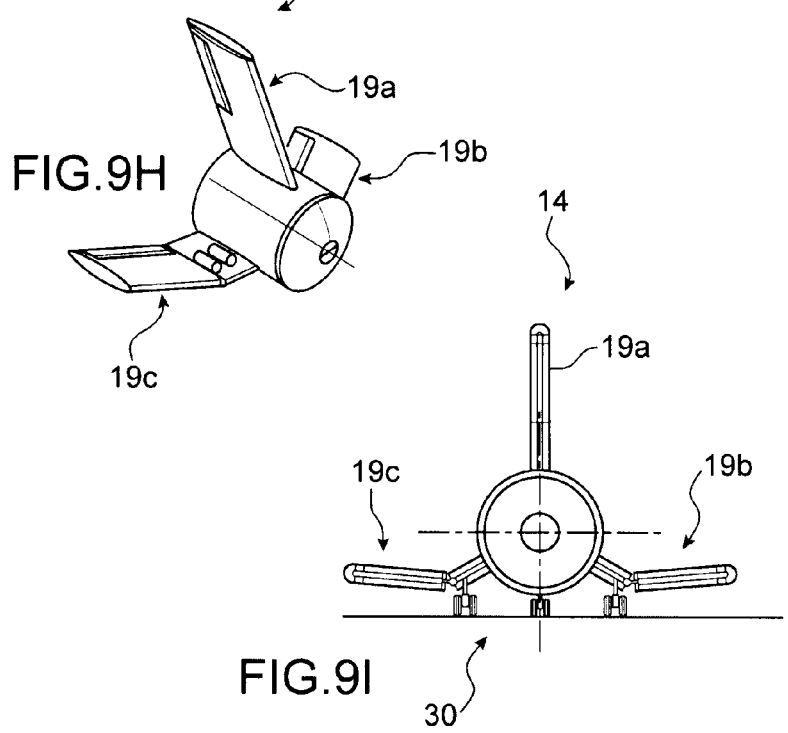
FIG.9H
FIG.9I

# REUSABLE MODULE FOR LAUNCHER

TECHNICAL FIELD AND PRIOR ART

The present invention relates to a reusable model intended to form part of a propulsion module intended to send a craft into space, where the craft is, for example, a launcher intended to send a payload into space, such as telecommunication satellites.

The Ariane V rocket is a well-known example of a launcher comprising a central body formed of a first stage, called the main cryogenic stage (EPC) and a second stage, called the storable propulsive stage (EPS). The first stage transports liquid oxygen and hydrogen cooled to very low temperatures, and these fluids supply a cryogenic motor. The final stage supports the payload to be launched, for example a satellite. The rocket also comprises, either side of the central body, two solid rocket booster stages (EAP) used for lift-off. The cryogenic motor is started before lift-off and operates until the separation of the first and second stages.

There are also launches using methane-based propulsion or solid fuel propulsion.

These launchers, and in particular the first stages of these launchers, are completely consumable, i.e. no attempt is made to reuse them.

The development and manufacture of a launcher represents a very substantial cost. Furthermore, such development is very lengthy.

It has thus been envisaged to design a launcher the first stage of which is reusable, i.e. it can return to earth without damage after being separated from the second stage. Such a launcher is described in document U.S. Pat. No. 6,454,216. The part of the launcher body forming the first stage consists of a lower propulsion part, an intermediate part formed by fuel and combustive tanks, and an upper part intended to return the first stage assembly to earth. To this end, the first stage is fitted with a set of means capable of allowing a return to earth and enabling it to land. The first stage comprises airfoils folded along the first stage when the launcher is launched, and intended to unfold for the return of the first stage to earth, a landing gear, a control system, and air-breathing motors for the return flight and for the landing manoeuvres.

This launcher has the advantage that it enables the entire first stage to be recovered completely.

However, such a construction has several disadvantages. Firstly, at the time of separation from the second stage, the tanks of the intermediate part are empty; they therefore represent a very large volume of very low mass. The average density of the first stage is consequently low, making the first stage very difficult to recover. In addition, the use of a large wing surface in proportion to the launcher's case is required, notably in the area of the tanks, which are generally quite flexible. The attachment area must therefore be stiffened. The addition of this wing surface and of strengtheners represents an additional mass which must be propelled, therefore implying an increase of the size of the tanks, and therefore a substantial increase of the cost of the launcher. Consequently, the gain obtained by recovering the first stage in full is partially lost in the modifications implied to allow this recovery. In addition, this type of launcher is very different from known launchers.

The aim of the present invention is therefore to offer a launcher the construction and operating costs of which are low compared to the costs of current launchers.

DESCRIPTION OF THE INVENTION

The aim described above is attained by a launcher comprising at least one stage, where the said stage is divided into two parts, a first part containing the rocket motors, the avionics, the propulsion bay, and the tank pressurisation system and the means of independent air-breathing flight (airfoil, air-breathing motor and its fuel), and a second part formed by the tanks, where both parts can be separated after launch, with the first part comprising means to allow its return to earth without damage in order to be reused in a new launcher. The first part forms the lower part of the said stage.

In other words, the aim is to reuse the elements having a high cost; to this end a detachable module with a airfoil and an aircraft engine allowing it to be landed on a conventional runway are manufactured. Non-recovery of the tanks enables the recovered part to be made much more easily recoverable, due to its increased density.

The lower position of the recovered part associated with the presence of tail units also gives the launcher itself greater stability during the ascending phase.

Advantageously, part of the launcher's tail unit is designed to be used as a wing surface for the return to earth, thereby eliminating the problem of the attachment of the wings, whilst not increasing the mass of the launcher.

The subject-matter of the present invention is then principally a recoverable module for a propulsion module intended to launch a craft into space comprising at least one stage, where the said recoverable module is secured to a part which is not recovered at launch, where the said recoverable module has a propulsive system intended for the launch of the craft, systems for command and control of the propulsive system, a subsonic flight propulsion motor, airfoils for the subsonic flight, a landing gear and a braking parachute, where the said recoverable module is intended to be installed in a lower position of the said stage, where the non-recovered part has at least one tank to feed the propulsive system, where the said recoverable module and the said non-recovered part are intended to be separated when the propulsion module reaches a given altitude, and where the recoverable module is capable of landing in a controlled fashion after a coasting flight, for example for a return to the launch site.

In a particularly advantageous fashion, the airfoils are formed by at least a part of the tail unit of the said craft. The tail unit comprises at least two fins. For example, it has three such, two of which are of modifiable shape to form airfoils.

Each of the two modifiable fins comprises, for example, a first part fixed on to the case of the module, and a second part installed so as to be movable on the first part, where the displacement of the second part relative to the first part is obtained, for example, by means of a least one electric or hydraulic motor.

The recoverable module also comprises, advantageously, a central channel having an axis which is shared with the axis of the recoverable module, where the subsonic flight propulsion motor is installed in the said central channel, together with the braking parachute enclosed in a unit called a canister, and where the said canister is installed in the exhaust duct at the rear of the motor of the subsonic flight propulsion motor.

In the case of a subsonic flight propulsion motor of the air-breathing motor type, its fuel may be stored in tanks positioned in the fins forming the tail unit.

Advantageously, the recoverable module has a blunt nose, to increase the supersonic wave drag during the initial phase of atmospheric re-entry, and to contribute to the deceleration of the recoverable module.

During the supersonic flight phase the recoverable module can comprise means to modify the drag of the base, for example means of the inflatable cone type.

The recoverable module can comprise attitude control systems to modify the attitude of the module relative to the trajectory plane, where the said systems are, for example, installed at the end of the fin of the tail unit forming a rudder unit.

The subject-matter of the present invention is also a propulsion module intended to launch a craft into space comprising at least one stage comprising a recoverable module according to the present invention, and a part intended not to be recovered, comprising at least one tank to supply the propulsive system.

The subject-matter of the present invention is also a craft of the launcher type equipped with a propulsion module according to the present invention, comprising at least two stages, a stage formed by the propulsion module and a stage supporting a payload, where the said two stages are separable, and where the launcher can range from the nanolauncher type to the super heavy launcher type.

In addition, the propulsion module can form the lower stage of the launcher or one of the upper stages.

The subject-matter of the present invention is also a method for recovery of the recoverable module according to the present invention comprising the following steps:

a) separation of the recoverable module and the non-recovered part,
b) freefall of the recoverable module,
c) deployment of the braking parachute when the speed of the recoverable module becomes subsonic,
d) start-up of the subsonic flight propulsion motor, and positioning of the airfoils,
e) jettisoning of the parachute,
f) starting a flare, after possible reacceleration,
g) return coasting, and
h) landing.

Advantageously, step c) takes place at a Mach speed compatible with the opening of a subsonic parachute, for example close to Mach 0.85.

During step a) separation of the recoverable module and of the non-recovered part can take place in a direction which is roughly orthogonal to the trajectory plane.

Step d) advantageously takes place at low dynamic pressure, of the order of 400 Pa, to facilitate the variation of the shape of the airfoil, and to have the time required to start the propulsion motor.

BRIEF DESCRIPTION OF THE DRAWINGS

The present invention will be better understood using the description which follows and the appended illustrations, in which:

FIGS. 9A to 9I are views of the module of FIG. 5 in the different configurations adopted during its return to earth.

DETAILED DESCRIPTION OF SPECIFIC EMBODIMENTS

Figure 1:
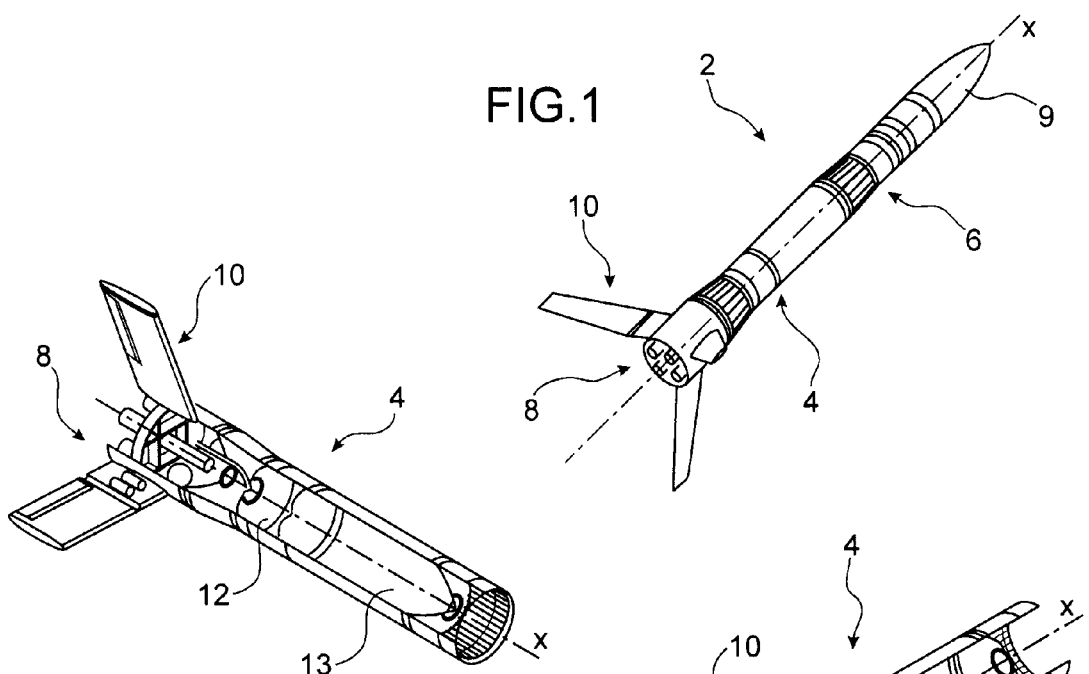
FIG. 1 is a perspective view of a twin-stage launcher according to the present invention.
Figure 2:
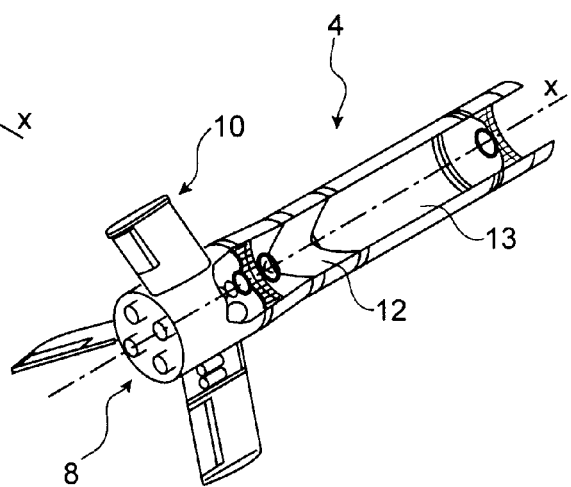
FIG. 2 represents cutaway views of the launcher of FIG. 1 represented from two different angles.
Figure 3:
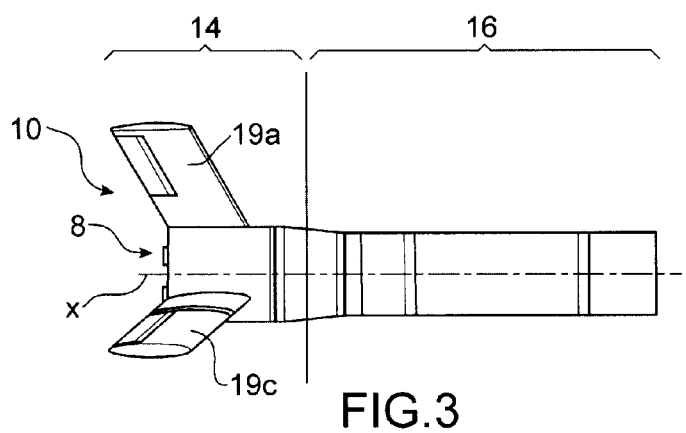
FIG. 3 is a longitudinal section view of FIG. 2.
Figure 4:
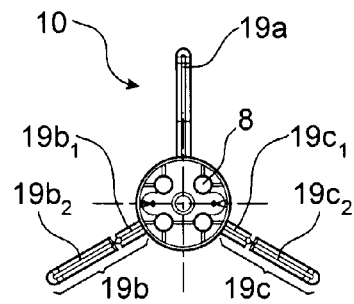
FIG. 4 is a rear view of the launcher of FIG. 3.

In the description which follows we shall describe in detail a launcher of the two-stage type to explain the invention, but it is clearly understood that the invention is not restricted to this type of launcher, as will be seen in due course.

FIGS. 1 to 4 show a launcher according to the present invention intended, for example, to place telecommunication satellites in orbit.

Launcher 2 comprises a first stage 4, a second stage 6 and a cowl 9.

The first stage 4 comprises the elements intended for the propulsion of the launcher, which will be described in due course.

The second stage 6 notably supports the payload, for example the satellite to be put into orbit.

The first stage comprises at its lower end a propulsive assembly 8 allowing the launcher to take off. In the represented example this propulsive assembly consists of four cryogenic motors and all the motors' control resources.

The launcher also comprises an tail unit 10 in the area of the lower part of the outer periphery of the first stage. The tail unit 10 contributes, during the lift-off phase, to the launcher's aerodynamic stabilisation. In the represented example the tail unit consists of three fins distributed uniformly around the periphery of the first stage.

The first stage 4 also comprises tanks 12, 13 of substances required for supplying the propulsive system 8 at lift-off. This is, in the case of cryogenic motors, a liquid oxygen tank 12, and a liquid hydrogen tank 13.

According to the present invention, the first stage 4 is divided into a first part 14 intended to be reused in a launcher, and a second part 16 intended to be lost, called the non-recovered part. The first part 14 is also called a module.

The module 14 comprises the elements of high cost, reuse of which is very advantageous. This consists notably of the propulsive assembly 8 of the launcher, the propulsion bay, the pressurisation system, the avionics and the means of electrical power generation.

The non-recovered part 16 containing the tank or tanks is manufactured such that it does not comprise, or comprises few, complex parts of high cost, so as to reduce the cost of the parts to be supplied for a new flight. Since the latter is consumable, its structure is reduced to the elements which are strictly required for feeding the propulsive system in an efficient and safe manner.

According to the invention, module 14 is of high density, since it does not comprise the empty volumes formed by the tanks after launch.

According to the present invention, module 14 is such that it ensures its return to earth. In FIGS. 9A to 9I, the module can be seen in the different phases of return to earth.

In the represented example, module 14 is installed in the area of the lower end of the first stage 4. Indeed, since module 14 has a substantial fin-stabilised surface, and since it is in a low position, it has the effect of moving back the aerodynamic centre and therefore increasing the static margin in the launcher's atmospheric ascendant phase.

It is then possible to lower the tank filled with oxygen, which is the heaviest element at lift-off. The effect of this is to bring the oxygen tank closer to the cryogenic motors, but the static margin remains sufficient to give the launcher great stability. Bringing the oxygen tank 12 closer to the cryogenic motors enables the length of the feed lines of the first stage to be reduced, leading to a reduction of the mass, the capacity, and therefore the cost of the first stage.

According to a particularly advantageous embodiment of the invention which shall be described in detail in due course, part of the tail unit is reused as airfoils for the return to earth. This is made possible, notably, by the low position of module 14, i.e. in the area of the launcher's tail unit. Indeed, the centre of gravity of the recoverable module is located in the area of the launcher's tail unit; consequently the tail unit, or at least part of it, can be used to perform the aerodynamic lift function of the module during the subsonic flight phase.

We shall now describe module 14 in detail, and specifically the means used to return it to earth.

Figure 5:
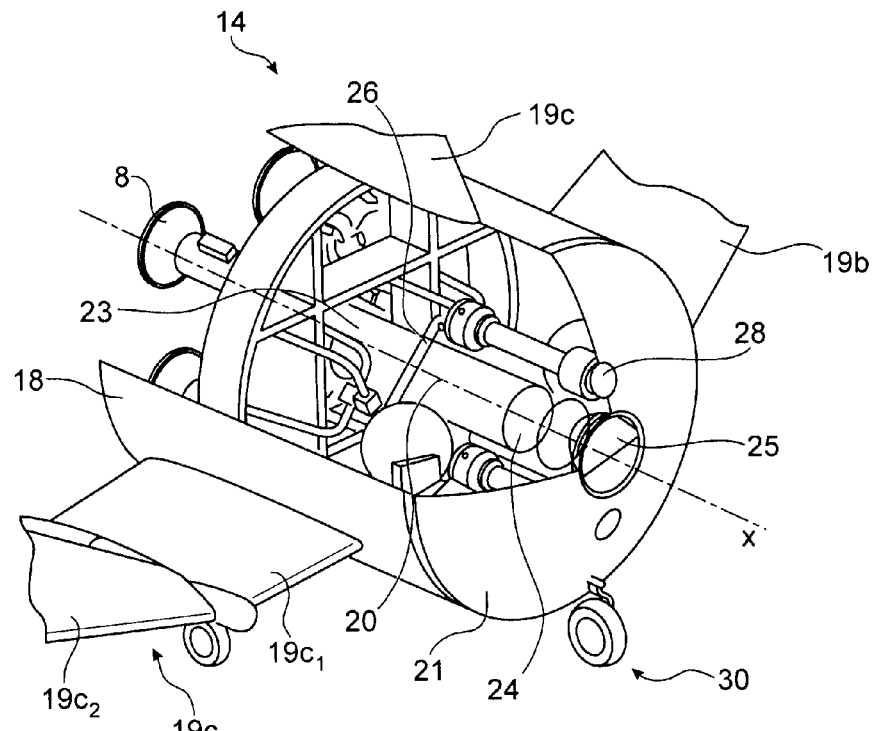
FIG. 5 is a cutaway perspective view of the reusable module according to the present invention.
Figure 6:
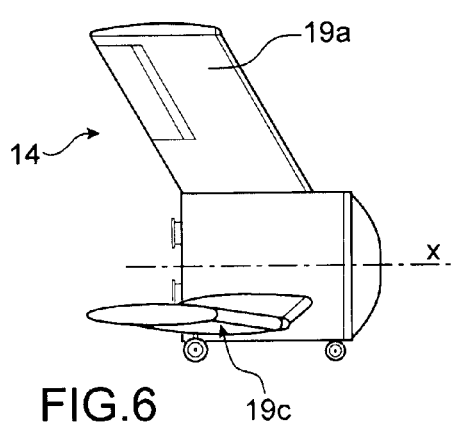
FIG. 6 is a side view of the module of FIG. 5.
Figure 7:
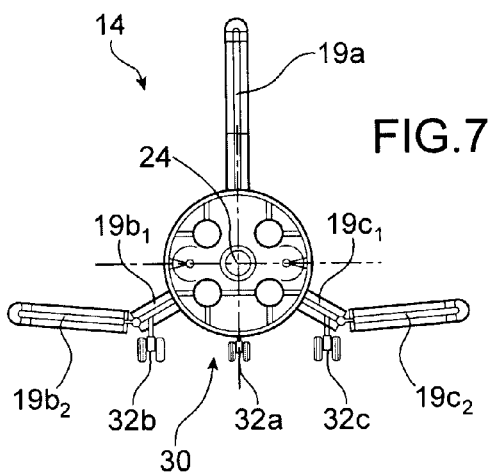
FIG. 7 is a view from behind of the module of FIG. 5, FIGS. 8A and 8B are diagrammatic representations of the trajectory of the module of FIG. 5 representing the height Z of the module in meters as a function of the distance D measured to the ground in meters travelled relative to the point of separation of the first and second stages.

In FIGS. 5 to 7, recoverable module 14 can be seen in its configuration where it is ready to undertake a flare, and where tail unit 10 has the configuration with a view to creating aerodynamic lift.

Module 14 comprises a case 18 which forms a part of the case of the first stage 4 and the three fins 19a, 19b and 19c of the tail unit 10 attached to the case 18 positioned 120° relative to one another.

Module 14 comprises a nose 21 of a blunt shape favouring braking due to the increased supersonic wave drag during the initial atmospheric re-entry phase; this shape reduces the maximum lengthways load factor (deceleration) and the maximum dynamic pressure on re-entry into the atmosphere, without the subsonic drag being penalised significantly.

Figure 9A:
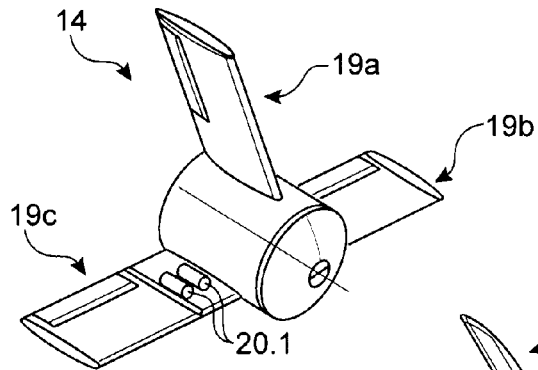
Figure 9B:
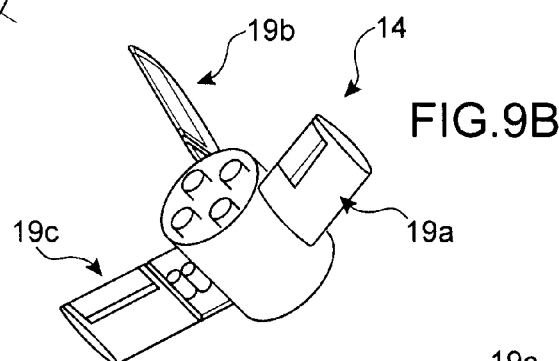
Figure 9D:
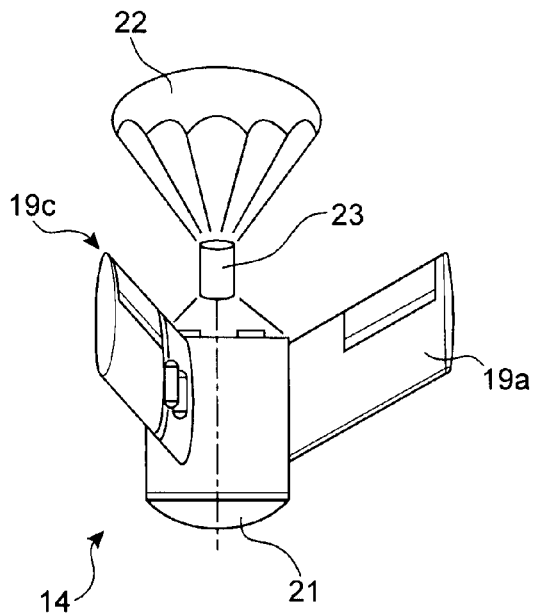

Module 14 also comprises the launcher's propulsive system, a motor 20, for example an aircraft engine of the air-breathing type, intended to propel the module during the return coasting, tanks 20.1 of fuel, of the kerosene type, positioned, for example, in the fins of the tail unit, as can be seen in FIG. 9A, to feed the motor 20.

Module 14 also comprises a braking parachute 22 enclosed in a canister 23.

In the example represented, and advantageously, module 14 comprises a tubular housing 24 or exhaust duct installed along lengthways axis X of the module, and emerging in the nose 21 of the module and in the base of the module. This central housing receives upstream motor 20 and downstream canister 23 with the parachute 22. The exhaust duct 24 could be designed outside the body; it would, for example, be formed from several channels distributed symmetrically around the body.

The end of the tubular housing 24 emerging in the nose 21 is closed by means of a tab 25; this tab is mobile to allow the motor 20 to be supplied with air.

When the module 14 forms the lower part of the launcher's first stage, pipes 26 of the module are connected to pipes (not represented) in the non-recovered part to connect the tanks of the non-recovered part 16 to the cryogenic motors 8 of module 14. When module 14 separates from the non-recovered part, these pipes 26 are blocked by valves 28 in the area where they are connected with the pipes of the non-recovered part.

Module 14 also comprises a landing gear 30. Since the module is very short it is not necessary to have a landing gear of great height. A fixed landing gear, which permanently protrudes from the surface of the launcher, can therefore advantageously be used. This can therefore be of very simple and very robust design. It is clearly understood that a module fitted with a retractable landing gear is not beyond the scope of the present invention.

The landing gear 30 consists of three wheels 32a, 32b, 32c. Wheel 32a is attached to the case of the module, and wheels 32b and 32c are attached to the fins 19b and 19c.

Module 14 comprises attitude control systems (not represented) intended to modify the attitude of the module. Advantageously, the attitude control systems are positioned at the end of the 19a forming the vertical stabilizer, and this fin is not intended to form a part of the airfoil. This position enables great leverage to be obtained, and therefore the module's attitude control to be facilitated. It is understood that these attitude control systems could be installed on the other fins or on the body of the module. The structure of these attitude control systems is known to the skilled man in the art.

According to a particularly advantageous embodiment of the present invention, two 19b, 19c of the three fins of tail unit 10 are configured so as to be able to form airfoils intended to allow the return to earth of the module during the slow flare, coasting return and landing phase. To accomplish this, their shapes are designed to be modifiable, and can change from a roughly flat shape for the launch of the launcher, to a lift shape during subsonic flight in order to support the module. Fins 19b, 19c are formed from two connected parts 19b1, 19b2 and 19c1, 19c2, enabling them to be transformed from launcher stabilisation fins into airfoils of module 14.

The first parts 19b1, 19c1 comprise a first proximal end attached directly to the case of the first stage, and a second distal end, on to which the two parts 19b2, 19c2 are assembled, connected by a first end. The change of configuration of the fins, more specifically the modification of the orientation of the two parts 19b2, 19c2 relative to the first parts 19b1, 19c1 may be obtained by simple, low-powered electric or hydraulic motors. Indeed, as we shall see in due course, the phase of transformation of the fins takes place at low dynamic pressure; they are not therefore subject to stress during the displacement of the non-recovered part, and there is therefore no requirement that the power required for such a displacement be high.

Module 14 is secured to the non-recovered part 16 by means of a known type, such as flanges.

Module 14 has great intrinsic passive stability, i.e. between the hypersonic flight and Mach 0.8, module 14 is automatically positioned with its nose facing forwards in the direction of the fall. Thus, in cases in which the module and the non-recovered part separate in a non-traditional manner, the module will automatically and naturally recover its stable position, without any specific means to accomplish this repositioning being required.

Figure 8A:
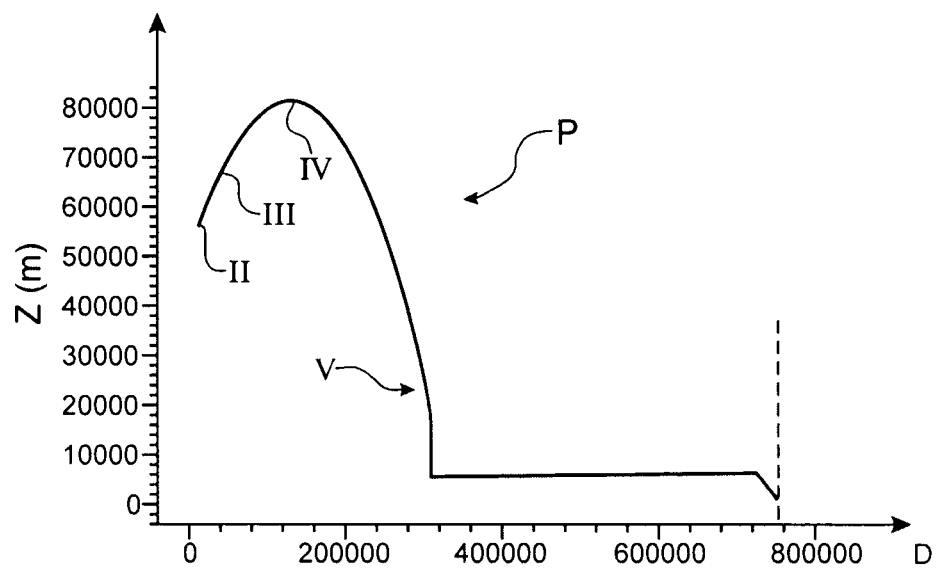
Figure 8B:
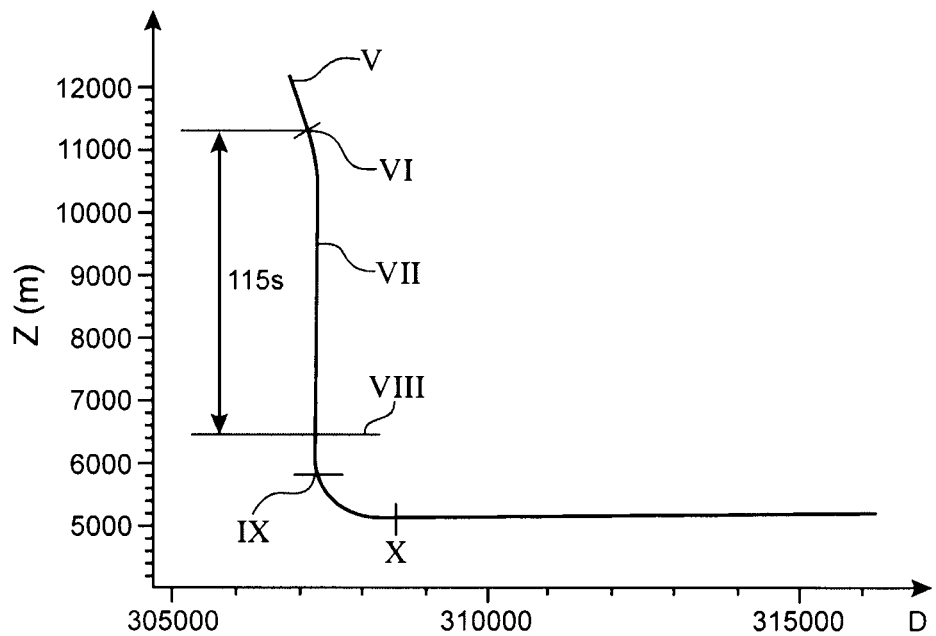

We shall now describe the different phases of the flight of the module according to the invention by means of FIGS. 8A and 8B and of FIGS. 9A to 9I.

In its initial configuration the launcher consists of the first stage 4, and the second stage 6 contains the payload and the nosecone. The first stage consists of module 14 and full tanks. Fins 19b and 19c of the tail unit are flat, i.e. the first 19b1, 19c1 and the second 19b2, 19c2 are roughly in the same planes, respectively.

The launcher fitted with module 14 lifts off vertically, propelled by the cryogenic motors, the latter being fed by the tanks contained in the non-recovered part.

At an altitude of some 50 km, the first stage 4 is detached from the second stage 6, the speed being approximately Mach 5. From this point forth, module 14 is attached only to the tanks, corresponding to step II of the trajectory represented diagrammatically in FIG. 8A.

After the separation from the second stage, the first stage 4 continues a sub-orbital ballistic trajectory (phase III) until it leaves the terrestrial atmosphere.

At this point module 14 is separated from the non-recovered part 16, the dynamic pressure being then very low, of the order of 20 Pa (phase IV).

Figure 9C:
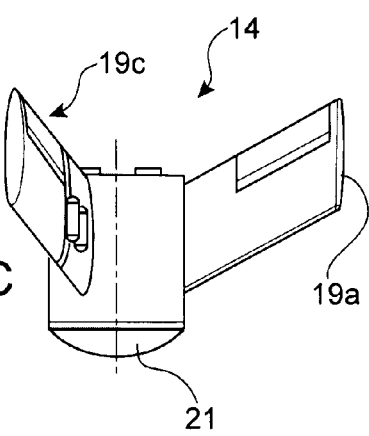

The separation of module and the non-recovered part can advantageously be accomplished in a direction perpendicular to the trajectory plane P, which is formed by the plane of the sheet of FIG. 8A, so as to provide sufficient discrimination between the module 14 and the non-recovered part 16. To do so, before the separation, the first stage is aligned such that its lengthways axis is roughly orthogonal to the plane of the trajectory P, using the attitude control systems installed at the end of fin 19a. When the first stage 6 is correctly aligned, the separation of the module 14 and the non-recovered part 16 is caused (FIG. 9A), by known means, for example means similar to those used for the separation of the first and second stages. Since module 14 has a very much greater density than that of the non-recovered part 16, the latter will fall faster and further. In addition, as previously indicated, due to its intrinsic stability the module will be aligned automatically such that its nose is facing downwards, as can be seen in FIG. 9C.

After this, module 14 falls according to a ballistic trajectory. At point V module 14 makes a ballistic atmospheric re-entry with zero angles of attack and of sideslip, until it reaches a subsonic speed, close to Mach 0.85. The altitude corresponding to this speed is approximately 10 km, corresponding to point 6 of the trajectory. It can be shown that this speed still corresponds roughly to an altitude of 10 km for different conditions of culmination of the first stage, and different values of the ballistic coefficient of module 14.

At point VI (FIG. 8B), therefore at an altitude of approximately 10 km, the braking parachute 22 is deployed (FIG. 9D), for example by means of a pyrotechnic charge. The canister 23 is ejected from the central housing, causing the braking parachute 22 to be deployed. The speed of the module reduces and the module stabilises. The module then follows a vertical trajectory, and the speed of the module is less than 50 m/s.

The case is attached to the module by cables.

Module 14 continues its descent with the braking parachute. (phase VII). According to the present invention, during this phase permission is given both for the motor 20 to be started, and for the change of configuration of the fins 19b, 19c with a view to creating an a airfoil by positioning them in a manner similar to a subsonic flying wing. As a consequence of the high altitude at which the braking phase begins (approximately 10 km), this phase is sufficiently long, for example it can last approximately 120 s. Accordingly, the module has sufficient time to undertake both operations.

Figure 9E:
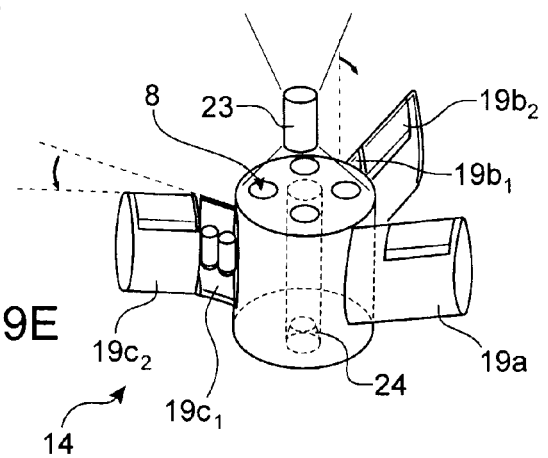

In FIG. 9E, the change of configuration of the fins of the tail unit can be seen.

The change of configuration of fins 19b and 19c when the braking parachute has been deployed has the advantage that it does not subject the aerodynamic surfaces of the fins to a bending stress. Indeed, as a consequence of the braking by the parachute 22 the movement of both parts 19b2, 19c2 of the fins takes place at very low dynamic pressure, of the order of 400 Pa. Moreover, as has been previously mentioned, the change of configuration can be obtained by means of simple low-power electric motors.

It should be noted that by using as a motor 20 a standard aircraft engine, the start-up time is approximately 2 minutes, which matches the duration of the parachute braking phase.

When the module has the shape of a flying wing and motor 20 has been activated, the braking parachute 22 is jettisoned (FIG. 9F) together with its canister 23, the altitude being approximately 6500 m (point VIII). The module then regains speed. When it reaches a speed of approximately 100 m/s the module makes a slow flare (FIG. 9G) between point IX and point X. This lasts for approximately 12 s, and ends with a level flying stage.

From point X is the return coasting phase; it takes place at subsonic speed of the order of Mach 0.3 and at an altitude of the order of 5000 m.

This coasting phase ends with a landing on a conventional landing runway, which is advantageously not far from the launcher's launch pad (FIG. 9I).

The module's flight can be completely independent or remotely controlled.

Module 14 according to the present invention accounts for more than 80% of the launcher's value and approximately 60% of the inert mass of the first stage. It is clearly understood that the percentage represented by the module relative to the total cost of the launcher depends on the number of motors of the propulsive system. Accordingly, by reusing module 14 the costs of manufacture of a new launcher can be reduced appreciably.

Moreover, the cost of development of module is significantly reduced compared to the cost of development of a completely reusable first stage, by approximately 35%.

If it is supposed that the launchers' motors will be reused ten times since module 14 is returned, corresponding approximately to a total lifetime of 2000 s, the average recurrent cost, if one considers a total lifetime of the module of 100 flights, of a first stage according to the present invention, is estimated at 25% of the cost of the equivalent consumable stage.

Attempts are advantageously made to produce very robust propulsion motors in order to maximise the number of reuses.

It therefore appears that the present invention allows a substantial reduction of the production and operating costs.

According to the invention, the lift aerodynamics take place only during the subsonic phase for the flare, and the coasting and landing phase. The invention therefore has the advantage that it is able to use known and tested technologies in the field of flying wings. The costs and development time are therefore reduced.

Advantageously, approximately 30° arrow-shaped fins can be chosen. By choosing this type of arrow, positions of the subsonic and hypersonic aerodynamic centres are obtained such that the flight is stable with zero angles of attack and of sideslip in the hypersonic, supersonic and transonic modes, and with a low angle of attack for a lift flight in subsonic mode.

Due to the invention, module 14 has a high space density, since it does not have the empty tanks, which facilitates its handling on its return to earth and its recovery scenario.

The blunt shape of the nose enables the wave drag to be maximised. It should be noted that tail unit fins with a thick profile, which are compatible with subsonic flight, also help increase the supersonic flight wave drag.

It is clearly understood that the shape of the fins described above is in no way restrictive, and it can be envisaged, for example, to manufacture fins 19b, 19c in more than two parts. It can also be envisaged to add winglets, marginal vertical fins, at the ends of fins 19a, 19c and/or 19c, to meet the needs of the ballistic re-entry and the return coasting. These winglets can be folding or non-folding.

The installation of motor 20 in a duct which shares the lengthways axis of the module feeds the base with hot air, the effect of which is to reduce the base drag, and therefore the overall drag.

The module's overall drag can be optimised still further during the return subsonic coasting flight, by optimising the module's base drag, bearing in mind that this drag represents the principal contribution to the subsonic overall drag. To accomplish this a rear cone of modifiable shape may be added, for example one which is inflated during the parachute braking phase 22.

The parachute and subsonic lift phases have many degrees of freedom to adjust the module's performance characteristics. The size of the braking parachute may be modified, the initial speed of the flare may be modified, the transverse load factor may be altered during the flare, and the return coasting altitude of the module as far as the landing runway can also be modified.

The recoverable module 14 according to the present invention can be used for every size of launcher, from nanolaunchers to super heavy launchers. This module can easily be adapted to different propulsion modules, different vehicle sizes and different types of mission.

Figure 10:
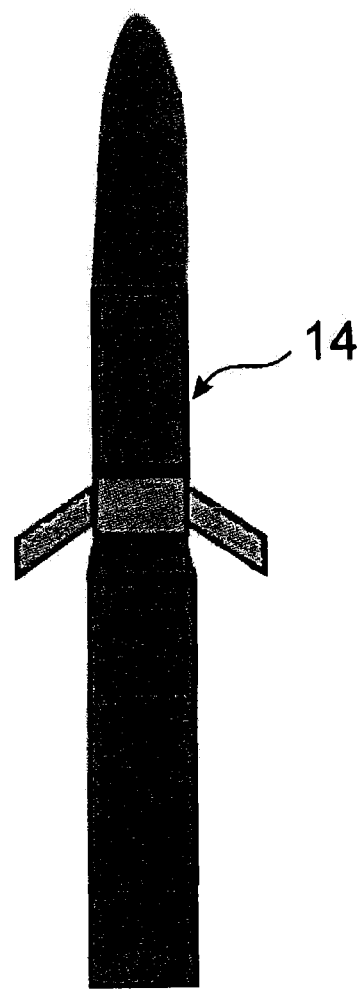
FIG. 10 is a view of a propulsion module forming one of upper stages.

The module according to the present invention has been described in the case of a two-stage launcher, but it can also apply to a vehicle with a single stage to form a demonstrator or a flying test bench for flight experiments, or to a launcher comprising at least two stages, where the module is located in the lower stage or in one of the upper stages as shown in FIG. 10.

The invention claimed is:

1. A recoverable module for a propulsion module configured to launch a craft into space, said craft comprising at least one stage, the recoverable module being securable to a non-recovered part that is not recovered at launch, and the recoverable module being configured to be installed in a lower position of the at least one stage, the recoverable module comprising:
   a propulsive system configured for launch of the craft;
   systems for command and control of the propulsive system;
   a subsonic flight propulsion motor;
   airfoils for the subsonic flight;
   a landing gear; and
   a braking parachute, wherein
   the propulsive system is fed by at least one tank comprised in the non-recovered part, and the subsonic flight propulsion motor is distinct from the propulsive system,
   the recoverable module and the non-recovered part being configured to be separated when the propulsion module reaches a given altitude, and
   the recoverable module being configured to land in a controlled fashion after a coasting flight, or to return to the launch site.

2. A recoverable module according to claim 1, in which the airfoils are formed by at least a part of a tail unit of the craft.

3. A recoverable module according to claim 2, in which the tail unit comprises at least two fins.

4. A recoverable module according to claim 3, comprising at least three fins of which at least two fins have a modifiable shape to form the airfoils.

5. A recoverable module according to claim 4, in which each of the at least two modifiable fins includes a first part attached to a case of the module and a second part installed so as to be movable on the first part, and in which displacement of the second part relative to the first part is obtained by at least one electric or hydraulic motor.

6. A recoverable module according to claim 3, in which each of two modifiable fins includes a first part attached to a case of the module and a second part installed so as to be movable on the first part, and in which displacement of the second part relative to the first part is obtained by at least one electric or hydraulic motor.

7. A recoverable module according to claim 1, comprising a central channel having an axis that is shared with an axis of the recoverable module, the subsonic flight propulsion motor being installed in the central channel, together with the braking parachute enclosed in a canister, and the canister being installed in an exhaust duct at a rear of the subsonic flight propulsion motor.

8. A recoverable module according to claim 1, in which the subsonic flight propulsion motor is an air-breathing motor fed with fuel by tanks installed in fins of a tail unit.

9. A recoverable module according to claim 1, in which the recoverable module has a blunt nose, to increase a supersonic wave drag during an initial phase of atmospheric re-entry, and to contribute to deceleration of the recoverable module.

10. A propulsion module configured to launch a craft into space, the propulsion module comprising at least one stage of the craft, and the propulsion module comprising a recoverable module according to claim 1 and a part configured to not be recovered comprising at least one tank to feed the propulsive system.

11. A craft of launcher type fitted with a propulsion module according to claim 10, comprising at least two stages, one stage formed by the propulsion module and a stage supporting a payload, the at least two stages being separable.

12. A craft of launcher type according to claim 11, in which the craft of launcher type ranges from a nanolauncher to a super heavy launcher type.

13. A craft of launcher type according to claim 12, in which the propulsion module forms a lower stage of the craft of launcher type or one of upper stages of the craft of launcher type.

14. A method of recovery of the recoverable module according to claim 1, comprising:
   a) separation of the recoverable module and the non-recovered part;
   b) freefall of the recoverable module;
   c) deployment of the braking parachute when a speed of the recoverable module becomes subsonic;
   d) start-up of the subsonic flight propulsion motor, and positioning of the airfoils during the deployment of the braking parachute;
   e) jettisoning of the braking parachute;
   f) starting a flare;
   g) return coasting; and
   h) landing.

15. A method according to claim 14, in which, during the separation a), separation of the recoverable module and of the non-recovered part takes place in a direction that is roughly orthogonal to the trajectory plane.

16. A method according to claim 14, in which the start-up d) takes place at low dynamic pressure, of order of 400 Pa, to facilitate variation of shape of the airfoil, and to have a time required to start the propulsion motor.

17. A method according to claim 14, wherein the starting the flare includes starting the flare to horizontally orientate the recoverable module.

18. A recoverable module for a propulsion module configured to launch a craft into space, said craft comprising at least one stage, the recoverable module being securable to a non-recovered part that is not recovered at launch, and the recoverable module being configured to be installed in a lower position of the at least one stage, the recoverable module comprising:
   a propulsive system configured for launch of the craft;
   systems for command and control of the propulsive system;
   a subsonic flight propulsion motor;
   airfoils for the subsonic flight;
   a landing gear;
   a braking parachute; and a central channel having an axis that is shared with an axis of the recoverable module, the subsonic flight propulsion motor being installed in the central channel, together with the braking parachute enclosed in a canister, and the canister being installed in an exhaust duct at a rear of the subsonic flight propulsion motor, wherein the non-recovered part comprising at least one tank to feed the propulsive system, the recoverable module and the non-recovered part being configured to be separated when the propulsion module reaches a given altitude, and the recoverable module being configured to land in a controlled fashion after a coasting flight, or to return to the launch site.

19. A recoverable module for a propulsion module configured to launch a craft into space, said craft comprising at least one stage, the recoverable module being securable to a non-recovered part that is not recovered at launch, and the recoverable module being configured to be installed in a lower position of the at least one stage, the recoverable module comprising:

a propulsive system configured for launch of the craft;

systems for command and control of the propulsive system;

a subsonic flight propulsion motor;

airfoils for the subsonic flight;

a landing gear; and a braking parachute, wherein the subsonic flight propulsion motor is an air-breathing motor fed with fuel by tanks installed in fins of a tail unit, the non-recovered part comprising at least one tank to feed the propulsive system, the recoverable module and the non-recovered part being configured to be separated when the propulsion module reaches a given altitude, and the recoverable module being configured to land in a controlled fashion after a coasting flight, or to return to the launch site.

* * * * *